United States Patent
Deachin et al.

(10) Patent No.: US 10,695,962 B2
(45) Date of Patent: Jun. 30, 2020

(54) MEMBERS FOR DIRECTING EXPANDABLE MATERIAL FOR BAFFLING, SEALING, REINFORCING

(71) Applicant: Zephyros, Inc., Romeo, MI (US)

(72) Inventors: Todd R. Deachin, Columbiaville, MI (US); Blake Synnestvedt, Birmingham, MI (US)

(73) Assignee: ZEPHYROS, INC., Romeo, MI (US)

(*) Notice: Subject to any disclaimer, the term of this patent is extended or adjusted under 35 U.S.C. 154(b) by 477 days.

(21) Appl. No.: 15/460,794

(22) Filed: Mar. 16, 2017

(65) Prior Publication Data

US 2017/0266855 A1 Sep. 21, 2017

Related U.S. Application Data

(60) Provisional application No. 62/310,172, filed on Mar. 18, 2016.

(51) Int. Cl.
*B29C 44/18* (2006.01)
*B29C 44/42* (2006.01)
(Continued)

(52) U.S. Cl.
CPC ............ *B29C 44/188* (2013.01); *B29C 44/42* (2013.01); *B29C 44/1271* (2013.01);
(Continued)

(58) Field of Classification Search
CPC ... B29C 44/188; B29C 44/42; B29C 44/1271; B29K 2063/00; B29K 2607/00;
(Continued)

(56) References Cited

U.S. PATENT DOCUMENTS

| 4,751,249 A | 6/1988 | Wycech |
| 4,901,500 A | 2/1990 | Wycech |

(Continued)

FOREIGN PATENT DOCUMENTS

| CN | 101812909 A | 8/2010 |
| CN | 101827746 A | 9/2010 |

(Continued)

OTHER PUBLICATIONS

International Search Report for application No. PCT/US2015/060853. dated Feb. 15, 2016.

(Continued)

*Primary Examiner* — Joseph S Del Sole
*Assistant Examiner* — Lawrence D. Hohenbrink, Jr.
(74) *Attorney, Agent, or Firm* — Bryan S. Lemanski; The Dobrusin Law Firm, P.C.

(57) ABSTRACT

An article comprising: (a) a carrier having a predetermined shape to guide one or more expansion directions of an injection molded expandable material; (b) the injection molded expandable material on the carrier; wherein the expandable material is formed on the carrier at one or more angles perpendicular to the one or more expansion directions; and wherein the expandable material is capable of being activated to expand under an activation condition to come into contact with, and adhere to one or more walls defining a cavity in order to at least partially fill the cavity.

18 Claims, 1 Drawing Sheet

(51) Int. Cl.
*B29K 677/00* (2006.01)
*B29K 627/06* (2006.01)
*B29K 621/00* (2006.01)
*B29K 623/00* (2006.01)
*B29K 607/00* (2006.01)
*B29K 667/00* (2006.01)
*B29C 44/12* (2006.01)
*B29L 9/00* (2006.01)
*B29K 63/00* (2006.01)

(52) U.S. Cl.
CPC ...... *B29K 2063/00* (2013.01); *B29K 2607/00* (2013.01); *B29K 2621/00* (2013.01); *B29K 2623/06* (2013.01); *B29K 2623/12* (2013.01); *B29K 2627/06* (2013.01); *B29K 2667/006* (2013.01); *B29K 2677/00* (2013.01); *B29K 2995/0002* (2013.01); *B29L 2009/00* (2013.01)

(58) Field of Classification Search
CPC ............ B29K 2621/00; B29K 2623/06; B29K 2623/12; B29K 2627/06; B29K 2667/006; B29K 2677/00; B29K 2995/0002; B29L 2009/00
USPC ....................................................... 264/46.4
See application file for complete search history.

(56) References Cited

U.S. PATENT DOCUMENTS

| | | |
|---|---|---|
| 5,266,133 A | 7/1993 | Hanley et al. |
| 5,575,526 A | 11/1996 | Wycech |
| 5,755,486 A | 5/1998 | Wycech |
| 5,766,719 A | 6/1998 | Rimkus |
| 5,932,680 A | 8/1999 | Heider |
| 6,058,673 A | 5/2000 | Wycech |
| 6,146,565 A | 11/2000 | Keller |
| 6,350,791 B1 | 2/2002 | Feichtmeier et al. |
| 6,378,933 B1 | 4/2002 | Schoen et al. |
| 6,467,834 B1 | 10/2002 | Barz et al. |
| 6,478,367 B2 | 11/2002 | Ishikawa |
| 6,489,023 B1 | 12/2002 | Shinozaki et al. |
| 6,720,387 B1 | 4/2004 | Stark et al. |
| 6,742,258 B2 | 6/2004 | Tarbutton et al. |
| 6,747,074 B1 | 6/2004 | Buckingham et al. |
| 6,793,274 B2 | 9/2004 | Riley |
| 6,846,559 B2 | 1/2005 | Czaplicki et al. |
| 6,883,858 B2 | 4/2005 | Barz |
| 6,890,021 B2 | 5/2005 | Bock |
| 6,921,130 B2 | 7/2005 | Barz |
| 7,077,460 B2 | 7/2006 | Czaplicki |
| 7,125,461 B2 | 10/2006 | Czaplicki et al. |
| 7,199,165 B2 | 4/2007 | Kassa et al. |
| 7,249,415 B2 | 7/2007 | Larsen et al. |
| 7,313,865 B2 | 1/2008 | Czaplicki et al. |
| 7,374,219 B2 | 5/2008 | Brennecke |
| 7,494,179 B2 | 2/2009 | Deachin et al. |
| 7,503,620 B2 | 3/2009 | Brennecke et al. |
| 7,641,264 B2 | 1/2010 | Niezur |
| 7,748,773 B2 | 7/2010 | Niezur |
| 7,784,186 B2 | 8/2010 | White |
| 7,841,647 B2 | 11/2010 | Niezur et al. |
| 7,892,396 B2 | 2/2011 | Sheasley |
| 7,926,867 B2 | 4/2011 | Kochert |
| 8,047,603 B2 | 11/2011 | Goral |
| 8,361,589 B2 | 1/2013 | Kraushaar |
| 9,096,005 B2 | 8/2015 | Kanie |
| 9,782,950 B2 | 10/2017 | Richardson |
| 2001/0042353 A1 | 11/2001 | Honda |
| 2002/0125739 A1 | 9/2002 | Czaplicki |
| 2003/0137162 A1 | 7/2003 | Kropfeld |
| 2004/0016564 A1 | 1/2004 | Lambert |
| 2004/0033324 A1 | 2/2004 | Meyer |
| 2004/0130185 A1 | 7/2004 | Hasler |
| 2004/0204551 A1 | 10/2004 | Czaplicki et al. |
| 2004/0256888 A1 | 12/2004 | Le Gall |
| 2005/0035628 A1 | 2/2005 | Behr |
| 2005/0230027 A1 | 10/2005 | Kassa |
| 2006/0008615 A1 | 1/2006 | Muteau |
| 2006/0181089 A1 | 8/2006 | Andre |
| 2007/0018483 A1 | 1/2007 | Kerscher |
| 2007/0080559 A1 | 4/2007 | Stolarski |
| 2007/0090560 A1 | 4/2007 | Kassa et al. |
| 2007/0090666 A1 | 4/2007 | Brennecke |
| 2007/0096508 A1 | 5/2007 | Rocheblave |
| 2007/0101679 A1 | 5/2007 | Harthcock et al. |
| 2008/0029200 A1 | 2/2008 | Sheasley |
| 2008/0060742 A1 | 3/2008 | Sheasley et al. |
| 2008/0308212 A1 | 12/2008 | Sheasley et al. |
| 2009/0085379 A1 | 4/2009 | Takahasi |
| 2009/0269547 A1 | 10/2009 | Meyer et al. |
| 2010/0021267 A1 | 1/2010 | Nitsche |
| 2010/0117397 A1 | 5/2010 | Richardson |
| 2011/0104413 A1 | 5/2011 | Mendibourne |
| 2011/0206890 A1 | 8/2011 | Belpaire |
| 2011/0241383 A1* | 10/2011 | Shin ................. B62D 29/002 296/193.06 |
| 2013/0133771 A1 | 5/2013 | Richardson |
| 2014/0087126 A1 | 3/2014 | Quaderer |
| 2014/0091584 A1 | 4/2014 | McConnell |
| 2015/0165737 A1 | 6/2015 | Richardson |
| 2016/0273160 A1 | 9/2016 | Braymand |
| 2017/0072887 A1 | 3/2017 | Richardson |
| 2018/0029328 A1 | 2/2018 | Richardson |
| 2018/0037703 A1 | 2/2018 | Richardson |
| 2018/0297248 A1 | 10/2018 | Morgan |

FOREIGN PATENT DOCUMENTS

| | | |
|---|---|---|
| CN | 102858510 A | 1/2013 |
| EP | 2559541 A1 | 2/2013 |
| JP | 2001179903 A | 7/2001 |
| WO | 02/086003 A1 | 10/2002 |
| WO | 03/072677 A1 | 9/2003 |
| WO | 03/011954 A1 | 12/2003 |
| WO | 03/103921 A1 | 12/2003 |
| WO | 2004/037509 A2 | 5/2004 |
| WO | 2016/077820 A2 | 5/2016 |

OTHER PUBLICATIONS

Chinese First Office Action dated Nov. 23, 2018, Application No. 201580062003.0.

* cited by examiner

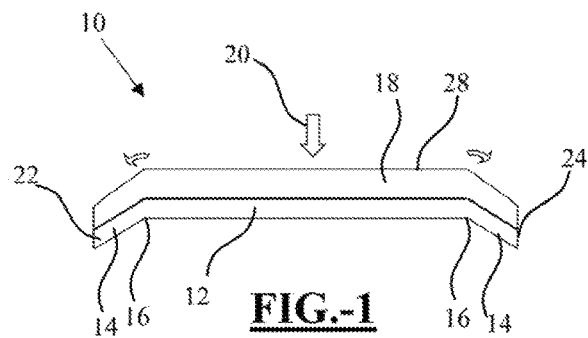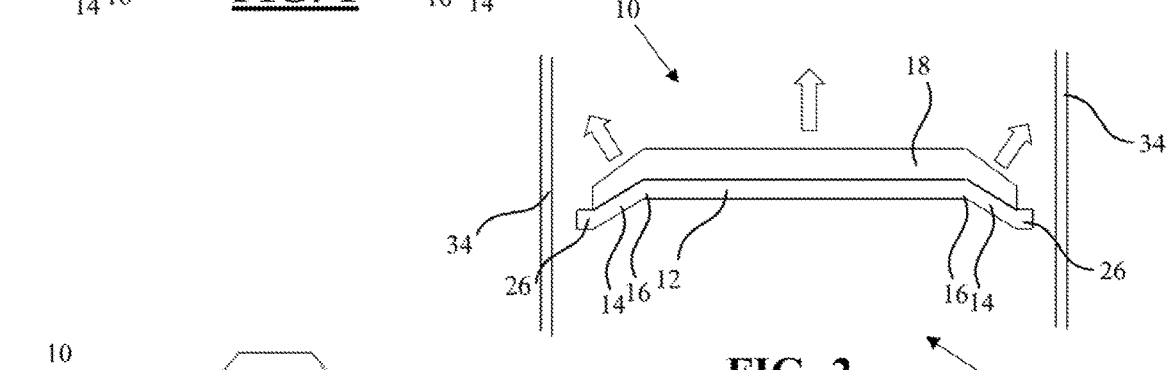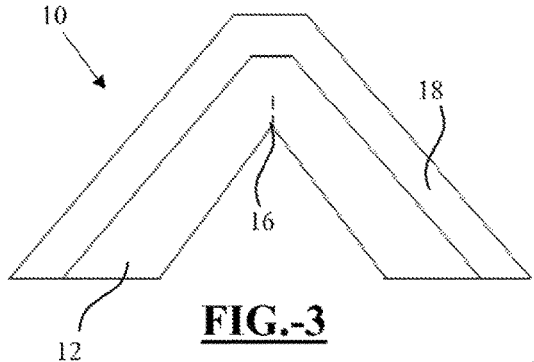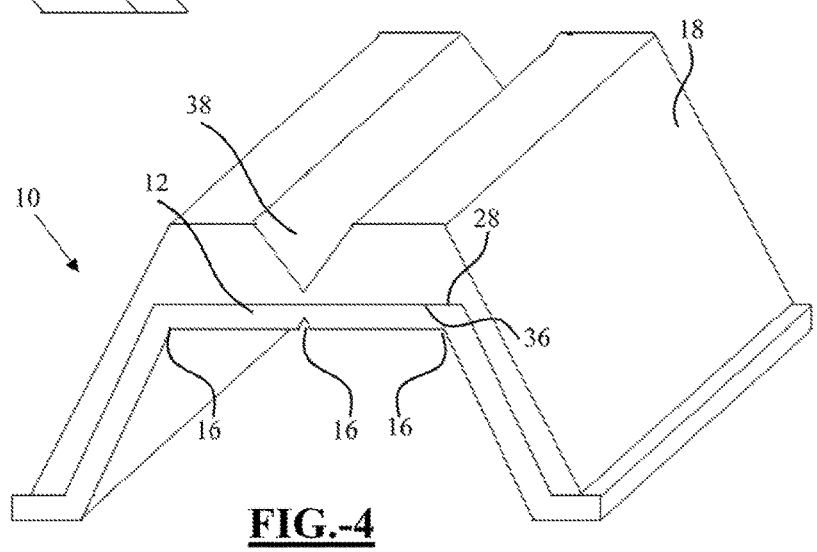

MEMBERS FOR DIRECTING EXPANDABLE MATERIAL FOR BAFFLING, SEALING, REINFORCING

This application claims the benefit of the filing date of U.S. Provisional Application Ser. No. 62/310,172 filed Mar. 18, 2016, the contents of such application being hereby incorporated by reference for all purposes.

FIELD

The present disclosure relates to a member which guides expansion of expandable material and may find particular noise in sealing, noise/vibration reduction, structural reinforcement, or a combination thereof. The present disclosure may specifically relate to a flexible member able to conform to various cavity widths while able to guide expansion of expandable material within the cavity.

BACKGROUND

Industries, such as the automotive industry, rely on devices for baffling, sealing, or reinforcing. Such members typically include an activatable material, such as an expandable material, which may be combined with other components for forming a seal, a baffle, a structural reinforcement or the like in a cavity, such as cavity of an automotive vehicle. U.S. Pat. Nos. 7,784,186; 7,249,415; 5,755,486; 4,901,500; and 4,751,249, and PCT Application No. PCT/US2015/060853 each of which is incorporated by reference, describe exemplary prior art devices for baffling, sealing, or reinforcing.

Injection molding processes provide for simplified customization of vehicle parts without requiring additional manufacturing steps or tools. Two-shot injection molding processes to form a carrier having an expandable material thereon are disclosed in U.S. Pat. Nos. 7,841,647; 7,494,179; and 7,503,620, each of which are incorporated by reference for all purposes. Traditionally, in injection molding processes, an expandable material is applied over a carrier, such that the bottom of the expandable material conforms with the carrier surface and fills in any gaps in the injection mold, such as by having a generally uniform upper surface of the expandable material while the thickness of the expandable material varies due to a profile of the carrier. All of the thickness of the expandable material may not be necessary to sufficiently seal the cavity in which the member is inserted. Additionally, typically expandable adhesive expands generally outwardly, with a tendency to expand perpendicularly, from outer surfaces of the expandable adhesive. This expansion can result in the expandable material expanding away from a surface (i.e., inner wall) of the cavity needing to be sealed or result in inefficient use of the expandable material in sealing the cavity, as only some of the expandable material contacts and adheres to the cavity surface.

Additionally, cavity members into which members for sealing the cavities are inserted typically have varying widths. The varying widths may be attributed to the design of the cavity, tolerance stack-up, and/or manufacturing variability. Devices having expandable material may be too rigid such that they cannot accommodate varying widths of cavity members (i.e., cavity widths smaller than a width of the device). Flexible devices having expandable material thereon, such as that disclosed in US Patent Publication No. 2014/0087126, may not have sufficient rigidity to guide expansion of the expandable material while yet being able to deform and conform to varying widths of cavities.

Thus, there is a need in the industry to provide improved devices which provide for better installation within varying tolerances, more rapid activation of the activatable material, and provide for installation in a variety of cavity configurations. There is a need to guide expansion of activatable material. There is a need to utilize less activatable material and retain the same sealing effectiveness. There is a need to provide for flexible sealing devices to accommodate variance in cavity width.

SUMMARY

The present disclosure relates to a device comprising: (a) a carrier having a predetermined shape to guide one or more expansion directions of an injection molded expandable material; (b) the injection molded expandable material on the carrier; wherein the expandable material is formed on the carrier at one or more angles perpendicular to the one or more expansion directions; and wherein the expandable material is capable of being activated to expand under an activation condition to come into contact with, and adhere to one or more walls defining a cavity in order to at least partially fill the cavity.

In some preferred embodiments, the carrier may include one or more hinge portions. In some preferred embodiments, the carrier may include one or more tail segments at one or more ends of the carrier. In some preferred embodiments, the one or more tail segments may be integrally attached to the carrier at one or more of the hinge portions.

The present disclosure relates to a method for forming a device comprising: (a) providing the carrier in a mold; and (b) injection molding the expandable material in the mold. In some preferred methods, the expandable material may flow onto one or more tail segments of the carrier.

The present disclosure relates to a method of using a device comprising: (a) inserting the device into a cavity, wherein the carrier and the expandable material deform at one or more hinge portions of the carrier to accommodate a width of the cavity; and (b) activating the expandable material under an activation condition, such that the expandable material expands outward in the one or more expansion directions guided by the carrier.

The device and methods of the disclosure may resolve the need for accommodating various tolerances and cavity configurations by deforming about one or more hinge portions. The device and methods of the disclosure may resolve the need for more rapid activation by having expandable material with a lesser thickness and yet retaining the same sealing effectiveness. The device and methods of the disclosure may resolve the need for guiding expansion of the expandable material by having a carrier which can guide expansion of the expandable material. The device and methods of the disclosure may resolve the need for guiding expansion of the expandable material by injection molding the expandable material onto the carrier such that the expandable material expands in a desired orientation.

BRIEF DESCRIPTION OF THE DRAWINGS

FIG. 1 illustrates injection molding of an expandable material onto a carrier according to the teachings herein.

FIG. 2 illustrates expansion of a device within a cavity according to the teachings herein.

FIG. 3 illustrates a hinge portion of a device according to the teachings herein.

FIG. 4 illustrates a baffle assembly according to the teachings herein.

DETAILED DESCRIPTION

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The disclosure relates to a device which may be a member for providing baffling, sealing, reinforcing, or a combination thereof to an article of manufacture. The device may guide expansion of an expandable material, may deform to conform to one or more widths of a cavity into which the device is inserted, or both. The device may include a carrier; and an injection molded expandable material on the carrier. The carrier may have a predetermined shape to guide one or more expansion directions of the injection molded expandable material. The expandable material may be formed on the carrier at one or more angles perpendicular to the one or more expansion directions. The expandable material may be capable of being activated to expand under an activation condition to come into contact with, and here to one or more walls defining a cavity in order to at least partially fill the cavity. The device may specifically be adapted to provide sealing, baffling or reinforcement within a structure's cavity. The device may find a particular benefit in conforming variability in a cavity's width, such as variability due to tolerance stack-up and/or manufacturing variability. It is contemplated that the member may be applied (e.g., assembled) to various articles of manufacture such as boats, trains, buildings, homes, furniture, or the like. It has been found however, that the member is particularly suitable for application to automotive vehicles.

The device of the disclosure may further comprise any one or more of the features described in this specification in any combination, including the preferences and examples listed in this specification, and including the following features: the carrier may include one or more hinge portions; the carrier may include one or more tail segments at one or more ends of the carrier, the one or more tail segments may be integrally attached to the carrier at one or more of the one or more hinge portions; the device may be able to deform at the one or more hinge portions to fit into the cavity; the expandable material may have a profile with varying thickness; the carrier may comprise a metallic material, polybutylene terephthalate (PBT), nylon, or a combination thereof; the carrier may be comprised of nylon; the carrier may be comprised of nylon at one or more hinge portions; one or more hinge portions may bend with application of pressure; the expandable material may include an expansion surface and an adhesion surface; the adhesion surface may match one or more contours of one or more surfaces of the carrier; an expansion surface of the expandable material may have a varying profile; an expansion surface of the expandable material may differ in profile than a surface of the carrier upon which the expandable material is adhered to; the device may be free of any expansion guiding members affixed to the expandable material or the carrier to guide expansion of the expandable material; the carrier may be free of expandable material at one or more hinge portions; the expandable material may have a lesser thickness at one or more hinge portions; the expandable material may be a structural layer, an acoustic material, a sealant, or any combination thereof.

The device of the disclosure includes a carrier. The carrier may function to affix the article to at least surface, deform to allow the device to fit within a cavity width smaller than the device's undeformed width, provide a surface carrying activatable material, guide the expansion of activatable material, or a combination thereof. The carrier may have a longitudinal axis. The carrier may include one or more straight, curved, bent, or angled portions. The carrier may be rigid, flexible, or a combination of both rigid portions and flexible portions. The carrier may be flexible or have flexible portions and thus may be formed to facilitate movement of the carrier and/or the activatable material along more than one axis. The carrier may include portions having a material thickness that is greater than the material thickness at other portions of the carrier. The portions having a greater thickness may be arranged in a position that is substantially parallel to or substantially perpendicular to a portion having a smaller thickness. The carrier may have a first surface and a second surface. The carrier may include an activatable material which may be located only onto select portion of the carrier. The activatable material may only be located on a first surface of the carrier. The activatable material may substantially enclose the entirety of the carrier. The activatable material be located on both the first and second surface of the carrier. Portions of the carrier may be located in different planes from one another. One or more surfaces of the carrier may be at an angle generally perpendicular to the expansion direction of the expandable material. The one or more surfaces of the carrier may guide expansion of the expandable material by being generally perpendicular to the expansion direction. The carrier may include protrusions which extend into the activatable material, such as to aid in retaining the activatable material on the carrier extension. The carrier may be attached to or integral with one or more fasteners, one or more extensions, one or more segments of activatable material, or a combination thereof. The carrier may include one or more hinge portions.

The device may include expandable material located on the carrier. The expandable material may be located onto substantially the entirety of the carrier or alternatively may be located onto only portions of the carrier. The expandable material may substantially entirely enclose the entirety of the carrier. Alternatively, the expandable material may substantially enclose only portions of the carrier. The expandable material may extend beyond an end of the carrier (i.e. beyond a point where the carrier terminates, such as beyond one or more tail segments). Alternatively, the expandable material may be substantially coextensive with an end of the carrier. The expandable material may be located onto any portion of the device (i.e., one or more tail segments, one or more fasteners). The expandable material may substantially enclose any portion of the device (i.e., one or more tail segments, one or more fasteners). Any portion of the carrier which forms a fastener, or any separately attached fastener, may also be substantially free of any expandable material. The expandable material may be located on one or more hinge portions or alternatively, one or more hinge portions may be substantially free of any expandable material. The expandable material itself may be formed to have a curved profile, varying profile height, or the like. In the event that the expandable material is not co-extensive with the carrier, the expandable material that extends beyond an end of the carrier may be curved. Any angle of curvature of any portion of the carrier, the activatable material, or both may be selected based upon the intended location of the device which may depend upon the shape of a cavity into which the device is to be located. The carrier and/or expandable material may be curved in a single direction or may be curved in multiple directions. The curve may form a substantially u-shaped or substantially v-shaped device. The expandable material may have an expansion surface and an adhesion surface. The adhesion surface may be the surface of the expandable material adhered to a surface of the carrier. The adhesion surface may have substantially the same profile or contours as the surface of the carrier onto which it is adhered (i.e. first surface). The expansion surface may be the opposing surface of the expandable material, opposite from the adhesion surface. The expansion surface may have substantially the same profile or differing profile as the profile of the carrier. The expansion surface may have a generally uniform profile or a varying profile (i.e. including contours, curves, varying thicknesses, etc). The expansion surface may be placed at an angle relative to the desired expansion direction of the expandable material, such as generally perpendicular to the expansion direction, to guide expansion of the expandable material. The expandable material may have a substantially uniform thickness or varying thickness.

The device may include one or more hinge portions. The one or more hinge portions may facilitate and/or guide flexing of the carrier, the expandable material, or both. The one or more hinge portions may allow or facilitate the device to deform, such that the device is able to conform to variability in cavity width of the cavity in which the device may be inserted and/or installed. The one or more hinge portions may include a single hinge or a plurality of hinges. The one or more hinge portions may be free of any bending or flexing along the hinge until pressure is applied to one or more portions of the carrier, the expandable material, or any combination thereof. The one or more hinge portions may bend or flex under their own weight without the application of additional pressure. The one or more hinges may be formed as joints, notches, indents, weak points, areas of the carrier and/or the expandable material substantially free of activatable material, living hinges, the like, or any combination thereof. The one or more hinge portions may be formed by portions of the carrier and/or expandable adhesive having a thinner cross-section than adjacent portions of the carrier and/or expandable adhesive cross-section. The one or more hinge portions may be formed by portions of the carrier and/or expandable material having a preformed curved shape. The one or more hinge portions may be located along a length of one or more of the carrier, the expandable material, or both. The one or more hinge portions may be formed at or may be the one or more joints where one or more tail segments extend from the carrier. The carrier, expandable adhesive, both may each have one, two, three, four, five, six, eight, ten or more hinge portions or any number therebetween. The carrier, expandable adhesive, or both may include twenty, eighteen, sixteen, fifteen or less hinge portions or any number therebetween. The hinge portions may allow the carrier, expandable material, or both to bend into an acute angle or obtuse angle about the hinge portion. The hinge portions may allow bending of the carrier, activatable material, or both at the hinge portion to an angle about 90 degrees or less, about 75 degrees or less, about 50 degrees or less, about 45 degrees or less, about 10 degrees or less, or even less, or any degree therebetween. The hinge portions may allow bending of the carrier, the expandable material, or both to an angle about 1 degree or more, about 3 degrees or more, about 5 degrees or more, or even more, or any degree therebetween. One or more tail segments may be integral with the carrier at one or more hinge portions.

The carrier may include one or more tail segments. The one or more tail segments may function to allow the carrier to deform, may function to guide expansion of the expandable material, may function to guide flow during injection molding of the expandable material, or any combination thereof. The one or more tail segments may be integral with the carrier. The one or more tail segments may extend from one or more ends of the carrier. The one or more tail segments may be integral with the carrier at one or more hinge portions. The one or more tail segments may include one or more hinge portions. The one or more tail segments may be parallel to a surface of the carrier, perpendicular to a surface of the carrier, skewed relative to a surface of the carrier, or any combination thereof. The one or more tail segments may be formed at the bottom of the carrier, extend away from the carrier, or both so as to provide a stop for the expandable material when the expandable material is injection molded onto the carrier. The one or more tail segments may be formed at a skewed angle relative to the surface of the carrier, such as an angle generally perpendicular to the expansion direction of the expandable material. The one or more tail segments may guide expansion of the expandable material by being generally perpendicular to the expansion direction.

The article may include one or more fasteners. The one or more fasteners may function to affix the carrier to a surface, such as a wall of a cavity. The one or more fasteners may be integrally formed with the carrier or separately formed from the carrier. The carrier may include one or more fasteners that are located so that they correspond with openings formed in a wall. The carrier may include a single fastener to be located into a wall opening or a plurality of fasteners located adjacent one another to be located into a plurality of adjacent wall openings. The one or more fasteners may include a fir tree fastener, arrowhead fastener, push pin fastener, clip fastener, the like, or any combination thereof. The fastener may be an arrowhead fastener whereby one or more terminal ends of the arrowhead include surfaces formed to contact and exert a force on a surface adjacent an opening in wall. The fastener may be shaped to include surfaces that lie in direct planar contact with a surface that lies adjacent an opening (e.g., an opening into which the fastener is located). The article may include a single fastener or a plurality of fasteners. The one or more fasteners may locate into and/or through an opening of a surface, such as a cavity wall, to affix the article. The one or more fasteners may receive a surface, such as a protrusion from a cavity wall, to affix the article. A carrier including multiple fasteners may be formed so that a first fastener is located in a first plane and a second fastener is located in a second plane that is the same or different from the first plane. A plurality of fasteners may be arranged parallel to one another. The plurality of fasteners may be arranged such that a first fastener may be perpendicular to a second fastener. The carrier may have sufficient flexibility so that prior to insertion into openings, a first fastener and second fastener may be located parallel to one another (e.g., in a first position relative to each other), but during use and upon insertion into openings, the first and second fasteners are located in a non-parallel relationship relative to each other (e.g., in a second position relative to each other).

The carrier may include a polymeric material. Exemplary materials include thermoplastics, rubbers, elastomers, and thermosets, including polyester, polypropylene, polyamide, molding compounds (e.g., sheet or bulk molding compound), polyethylene, polyvinylchloride, polybutylene terephthalate (PBT), combinations thereof or the like. The carrier may comprise a nylon material. The carrier may comprise a metallic material.

The expandable material may include an epoxy-based foam. Exemplary materials include a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow. The expandable material may have an activation temperature or melting temperature greater than the activation temperature or melting temperature of the carrier. If one or more expandable layers of the expandable material are present, the one or more expandable layers may have the same activation temperature or differing activation temperatures. Examples of suitable expandable materials layers can be found in U.S. Pat. Nos. 7,892,396 and 7,313,865; 7,125,461; and 7,199,165 and U.S. Published Application Nos. 2004/0204551; 2007/0090560; 2007/0101679; 2008/0060742; and 2009/0269547, each incorporated by reference herein for all purposes. Additional suitable materials may be sold as L-5520 and L-2821, available from L&L Products, Inc. in Romeo, Mich. Suitable expandable materials may also be considered suitable structural layers, sealing layers, acoustic layers, adhesive layers, reinforcement layers, fastening layers, second carrier layers, protective layers, or encapsulating layers. As an example, a layer may provide a sealing capability, but may also be an expandable material that provides acoustic control.

The expandable material include an acoustic layer. Any acoustic layers may include a polymer-based acoustic foam, and more particularly an ethylene based polymer. For example, the foamable material may be based on an ethylene copolymer or terpolymer that may contain a C 3 to C 8 alpha-olefin comonomer. Examples of particularly preferred polymers include ethylene vinyl acetate copolymers, ethylene acrylate copolymers, EPDM, or mixtures thereof. Other examples of preferred foam formulations that are commercially available include polymer-based materials commercially available from L&L Products, inc. of Romeo, Mich., under the designations as L-2105, L-2100, L-7005 or L-2018. Additional suitable materials are described in U.S. Pat. Nos. 5,266,133; 5,766,719; 5,755,486; 5,575,526; and 5,932,680, each incorporated by reference herein for all purposes. As discussed above with reference to any expandable layers, suitable acoustic layers may also be considered suitable expandable layers, sealing layers, adhesive layers, reinforcement layers, fastening layers, or second carrier layers.

The expandable material may include an adhesive or reinforcement layer. Any adhesive or reinforcement layer may include an epoxy based adhesive. Suitable adhesives may include one or more of an epoxy component, an epoxy/elastomer adduct, a curing agent, an accelerating agent, a phenoxy resin, a core/shell polymer, additional polymers/copolymers, blowing agents, and fillers. Examples of suitable adhesives are described in U.S. Pat. Nos. 6,846,559; and 7,892,396 and U.S. Patent Publication Nos. 2008/0060742; and 2008/0308212, the contents of these being hereby incorporated by reference for all purposes. As discussed above with reference to any expandable layers, suitable adhesive and reinforcement layers may also be considered suitable expandable layers, acoustic layers, sealing layers, fastening layers, or second carrier layers.

Formation of the device of the disclosure may include a variety of processing steps depending on the desired configuration of the member. In any event, it is generally contemplated that the carrier, the one or more carrier extensions, and the activatable material may be manually attached to each other, automatically attached to each other, or a combination thereof. Moreover, various processes such as molding (e.g., compression, injection, or other molding), extrusion, pultrusion, or the like may be used to form the carrier, the activatable material, the one or more fasteners, the one or more carrier extensions, the one or more activatable material extensions, and such processes may be employed to attach these components together. One or more of the carrier and/or activatable material may be formed in processes disclosed in PCT Application No. PCT/US2015/060853, incorporated by reference herein for all purposes.

The disclosure may further relate to a method for forming the device of the disclosure. The method may comprise providing the carrier in a mold; and injection molding the expandable material in the mold. The method of the disclosure may further include the expandable material flowing onto one or more tail segments of the carrier.

The disclosure may further relate to a method for using the device of the disclosure. The method may comprise inserting the device into a cavity and activating the expandable material under an activation condition. When the device is inserted into the cavity, the carrier and the expandable material may deform at one or more hinge portions of the carrier to accommodate a width of the cavity. During activation, the expandable material may expand generally outward in one or more expansion directions guide by the carrier.

ILLUSTRATIVE EMBODIMENTS

The following descriptions of the Figures are provided to illustrate the teachings herein, but are not intended to limit the scope thereof.

FIG. 1 illustrates a cross-section of a device 10 during injection molding. The device 10 may include a carrier 12. The carrier 12 may include one or more tail segments 14. The one or more tail segments 14 may be integral with the carrier 12 at one or more hinge portions 16. During injection molding, an expandable material 18 may be molded onto the carrier 12. The flow of the expandable material 18 during injection molding may be downward 20 toward the upper surface of the carrier. The expandable material 18 may be injected at about the center of the carrier 12. After being injected onto the carrier, the expandable material 18 may flow outwardly (shown by curved arrows) toward one or more ends 22, 24 of the carrier. The expandable material 18 may flow towards and/or onto one or more tail segments 14. Part of the tail segments 14 may provide a stop 26 for the expandable material to restrict further flowing (as shown in FIG. 2). The expandable material may include an adhesion surface 28 and an expansion surface 30. The adhesion surface 28 may be the surface adhered to the carrier 12. The expansion surface 30 may be the outer surface of the expandable material.

FIG. 2 illustrates a cross-section of a device 10 during expansion within a cavity 32. The cavity may comprise one or more walls 34. The expandable material 18 may expand generally outwardly when activated by an activation condition. The expandable material 18 may expand substantially perpendicularly to the initial (i.e., green state) surface profile of the expansion surface 30. The carrier 12 and/or the one or more tail segments 14 may guide expansion of the expandable material 18. The expandable material 18 may expand substantially perpendicularly to the surface of the carrier 12 and/or one or more tail segments 14. Portions of the expandable material 18, the carrier 12, and/or the one or more tail segments 14 may be oriented toward the one or more cavity walls 34, such as to guide expansion of the expandable material 18 toward the one or more cavity walls 24.

FIG. 3 illustrates a cross-section of a hinge portion 16 of the device 10. The hinge portion 16 may have smaller (i.e. thinner) cross-section than other cross-sections of the carrier 10. One or more of the hinge portions 16 may be located along any length of the carrier 12. The hinge portion 16 may flex upon itself when pressure is applied to the device 10. The hinge portion 16 may allow the carrier 10, the expandable material 18, or both to flex or bend into an acute angle. The hinge portion 16 may flex when the device 10 is inserted within a cavity 32 (not shown).

FIG. 4 illustrates a perspective view of the device 10 as a baffle assembly. The device 10 may include a carrier 12. The carrier may include a plurality of hinge portions 16. One or more of the hinge portions 16 may be integral with or connect the carrier 12 to one or more tail segments 14. The carrier 12 may include one or more hinge portions 16 formed as indents or notches along the length of the carrier 12. The one or more hinge portions 16 may extend along an entire length of the carrier 12. One or more hinge portions 16 may be located along the longitudinal axis of the carrier 12. One or more portions of the carrier 12 may be angled perpendicular to a desired expansion direction of expandable material 18, such as to guide expansion of the expandable material 18. Expandable material 18 may be adhered onto the carrier 12. The expandable material 18 may have an adhesion surface 28 and an expansion surface 30. The adhesion surface 28 may have substantially the same contour or profile as the carrier surface 36 to which it is adhered to. The expansion surface 30 may have a varying profile different from that of the carrier surface 36. The expandable material 18 may have thicker sections and thinner sections of expandable material 18. The expandable material 18 may include one or more portions of the expansion surface 30 oriented to guide expansion of the expandable material toward one or more cavity walls 34 (not shown). The expandable material 18 may have one or more notches 38 formed therein. The notches 38 may allow the expandable material to efficiently and more rapidly expand upon activation. The notches 38 may be located adjacent, proximate, and/or opposing one or more hinge portions 16 so as to further enable bending or flexing of the device at one or more hinge portions 16.

LIST OF REFERENCE NUMERALS

10 Device
12 Carrier
14 One or more tail segments
16 One or more hinge portions
18 Expandable material
20 Injection molding direction
22 Carrier end
24 Second carrier end
26 Stop of tail segment
28 Adhesion surface
30 Expansion surface
32 Cavity
34 One or more cavity walls
36 Carrier surface
38 Notch of activation material Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:
1. A device comprising:
a) a carrier having a predetermined shape to guide one or more expansion directions of an injection molded expandable material, the carrier having one or more hinge portions, wherein the one or more hinge portions include an indent on a first surface of the carrier;
b) the injection molded expandable material on a second surface of the carrier opposing the first surface, the expandable material having a notch formed therein, wherein the notch directly opposes and aligns with the indent,
wherein the notch and the indent are located along a longitudinal axis of the carrier;
wherein the expandable material is formed on the carrier at one or more angles perpendicular to the one or more expansion directions; and
wherein the expandable material is capable of being activated to expand under an activation condition to come into contact with and adhere to one or more walls defining a cavity in order to at least partially fill the cavity.
2. The device of claim 1, wherein the carrier includes one or more tail segments at one or more ends of the carrier.
3. The device of claim 2, wherein the one or more tail segments are integrally attached to the carrier by the one or more hinge portions.

4. The device of claim 3, wherein the device deforms at the one or more hinge portions to fit into the cavity during insertion into the cavity.

5. The device of claim 1, wherein the expandable material has a profile with varying thickness.

6. The device of claim 1, wherein the carrier comprises a metallic material, polybutylene terephthalate (PBT), nylon, or a combination thereof.

7. The device of claim 1, wherein the one or more hinge portions bend with the application of pressure.

8. The device of claim 1, wherein the expandable material includes an expansion surface and an adhesion surface; and
   wherein the adhesion surface matches one or more contours of one or more surfaces of the carrier.

9. The device of claim 1, wherein an expansion surface of the expandable material has a varying profile.

10. The device of claim 1, wherein an expansion surface of the expandable material differs in profile from a surface of the carrier upon which the expandable material is adhered to.

11. The device of claim 1, wherein the device is free of any expansion guiding members beyond the carrier that are affixed to the expandable material or the carrier to guide expansion of the expandable material.

12. The device of claim 1, wherein the carrier is free of expandable material at the one or more hinge portions.

13. The device of claim 1, wherein the expandable material has a lesser thickness at the one or more hinge portions.

14. The device of claim 1, wherein the expandable material is a structural layer, an acoustic material, a sealant, or any combination thereof.

15. The device of claim 1, the expandable material is only located on the second surface.

16. The device of claim 1, wherein the notch further enables bending or flexing of the device.

17. The device of claim 1, wherein the one or more tail segments include a stop located at a terminal end of the carrier to restrict further flowing of the expandable material and the stop is free of the expandable material.

18. The device of claim 1, wherein portions of the first surface of the carrier are in different planes from one another prior to insertion in the cavity.

* * * * *